United States Patent [19]
McDonnell

[11] Patent Number: 5,630,695
[45] Date of Patent: May 20, 1997

[54] PALLET SORTING MACHINE

[75] Inventor: James J. McDonnell, Eastwood, Australia

[73] Assignee: Flomat Pty Ltd, Eastwood, Australia

[21] Appl. No.: 528,317

[22] Filed: Sep. 14, 1995

[51] Int. Cl.$^6$ ............................................. B65G 60/00
[52] U.S. Cl. ..................... 414/751; 209/630; 209/704; 414/786; 414/788.7; 414/928
[58] Field of Search .................................. 209/630, 704, 209/919, 922; 414/751, 753, 786, 788.6, 788.7, 928, 929

[56] References Cited

U.S. PATENT DOCUMENTS

| | | | |
|---|---|---|---|
| 3,887,082 | 6/1975 | Posselt | 414/753 X |
| 5,096,369 | 3/1992 | Ouellette | 414/788.7 |

FOREIGN PATENT DOCUMENTS 2588843  4/1987  France ............................ 414/543

*Primary Examiner*—Karen B. Merritt
*Assistant Examiner*—Janice L. Krizek
*Attorney, Agent, or Firm*—Thorpe, North & Western

[57] ABSTRACT

A sorting machine 10 having a lifting and rotating apparatus 11 which includes a rotatable platform 16 upon which a stack of pallets 1 can rest so as to be supported from underneath and a scissor lift 14 for raising and lowering the stack so that the uppermost pallet 1 is moved firstly to an inspection level where it is rotated with the rotatable platform 16 for exposing its top and sides to an operator and then to a transfer level. The machine 10 also has a support device 12 having tynes 17 which moves into an extended position to support and maintain the pallet 1 at the transfer level when the scissor lift 14 is lowered to thereby expose the bottom of the pallet to the operator, and a transfer carriage 13 to engage opposite sides of the pallet 1 and support the pallet 1 from underneath. The pallet 1 is then transported by the transfer carriage 13 to one of a plurality of outfeed stations 25 after the support device 12 is moved into its retracted position.

26 Claims, 6 Drawing Sheets

PALLET SORTING MACHINE

BACKGROUND OF THE INVENTION

1. Field of the Invention

The present invention relates to a sorting machine for sorting damaged wooden pallets into different predetermined categories for assisting in the repair of the pallets.

2. Discussion

Wooden pallets are commonly used to transport materials and generally comprise at least two, usually three, horizontal bearers having a number of cross-boards fixed on opposite edges thereof. The pallets are reusable and, over time, sustain damage necessitating repair. The types of repair required by such damaged pallets can be assigned to different categories in order to streamline the repair process.

Typically, the repair of wooden pallets is carried out by first inspecting each pallet for the type of repair required and delivering it to a repair workstation dedicated to a particular type of repair. To date, the task of inspecting the pallets has been carried out using, for example, a forklift truck to lift individual pallets so that all sides and the top and bottom of the pallet can be viewed and a decision made as to what type of repair(s) is/are required. This is a slow and laborious task and seriously limits the efficiency and cost-effectiveness of repairing the pallets.

It would be desirable to provide a semi-automated system where an operator is only required to inspect the pallet as it is being manipulated by an automated machine. The problem in providing such a machine is that the damaged pallets are often difficult to handle due to the various types of damage they have sustained and for this reason it has been thought that a machine could not be used. It has also been doubted whether a machine could handle the pallets sufficiently quickly with known standard lifting/handling mechanisms to allow the operator to inspect all sides of the pallet in a time efficient manner.

SUMMARY OF THE INVENTION

The present invention provides a sorting machine for damaged pallets wherein each pallet has one or more recesses extending between opposite ends thereof for receiving tynes of a forklift or the like and sides extending between the ends so as to be generally rectangular in plan view, the sorting machine comprising:

- a lifting and rotating apparatus having a first pallet support means, the apparatus being adapted to support and raise a pallet to a predetermined level, and to rotate the pallet about a generally vertical axis;
- a support device having a second pallet support means, the device being movable between a retracted out of use position and an extended position supporting the pallet at the predetermined level; and
- a transfer carriage having a third pallet support means which is movable between a disengaged position spaced away from the pallet and an engaged position for supporting the pallet, the transfer carriage being movable to transfer the pallet to one of a plurality of delivery locations which is selected by the operator depending on the type of damage the pallet has sustained;
- a control means to control and coordinate operation of the lifting and rotating apparatus, the support device and the transfer carriage;

wherein, in use, each of the support devices are arranged and controlled so as not to interfere with one another.

Preferably, the first support means supports the pallet from underneath, the second support means is in the form of one or more tynes which are receivable in recesses of the pallet and the third support means is in the form of opposed articulated arms, and wherein in use, the support device is initially in its retracted position and, after the pallet has been rotated and raised by the lifting and rotating apparatus, the support device is then moved into its extended position with the tyne(s) being received in the recess(es) of the pallet to thereby support the pallet, the support device remaining in the extended position as the lifting and rotating apparatus is lowered and as the opposed articulated arms of the transfer carriage are caused to engage and support the pallet, whereupon the support device is moved into its retracted position and the pallet is then transferred to the selected delivery location.

Preferably, the arms of the transfer carriage, when in their engaged position, engage and bear against opposite sides of the pallet to securely capture the pallet therebetween.

The lifting and rotating apparatus preferably rotates the pallet at least about 160°, and more preferably 180° about the vertical axis.

Preferably, the lifting and rotating apparatus includes a pallet level detector which signals the control means when an uppermost pallet of one or more pallets supported on the lifting and rotating apparatus, is at an inspection level whereat the pallet is rotated, or at a transfer level which defines the predetermined level and is a predetermined distance above the inspection level whereat, in use, the support device supports the pallet as the lifting and rotating apparatus is lowered and the transfer carriage engages and supports the pallet. In use, the lifting and rotating apparatus preferably supports a stack of pallets, and the level detector detects when an uppermost pallet on the stack is at the inspection level or the transfer level.

The lifting and rotating apparatus is preferably in the form of a platform having a generally flat surface to support a pallet resting thereon, the platform being rotatable about the generally vertical axis, with a vertical lifting means to raise or lower the platform.

Preferably, the support device is movable between its extended and retracted positions along a generally horizontal guide track.

Preferably, the arms of the transfer carriage each have first and second portions, with the first portion being pivotally mounted to a support frame of the carriage and a second portion being pivotally mounted to the first portion, the arms being movable between the disengaged position wherein the first and second portions are spaced above the pallet at the transfer level, to the engaged position wherein each arm extends downwardly from the frame with the first portions bearing inwardly against opposite sides of the pallet and the second portions being positioned under the pallets so that the pallet is securely supported by the transfer carriage.

Preferably, the support device moves between its retracted and extended positions in a first direction relative to the inspection zone, and the transfer carriage operates in a second direction generally normal to the first direction.

Preferably, each delivery location has a support platform which is vertically movable to a pallet receiving level to receive and support a pallet released from the transfer carriage for delivering the pallet to a predetermined pallet repair work station. Each delivery location preferably has a pallet level detector which detects when the support platform, a pallet resting on the support platform or an uppermost pallet on a stack of pallets resting on the support platform is at the pallet receiving level, and signals the control means for controlling the vertical movement of the support platform of that delivery location.

Preferably, the sorting machine further comprises an infeed conveyor means for transferring said pallet, or a stack of pallets from a pallet loading position to the lifting and rotating apparatus.

The present invention also provides a method of handling pallets to be inspected and sorted into predetermined categories, the method comprising the steps:

supporting a pallet by a first support means, raising the pallet to a predetermined level and rotating the pallet about a generally vertical axis to expose all sides and top of the pallet to an operator;

supporting the pallet by a second support means removing support to the pallet from the first support means to expose the bottom of the pallet to the operator;

moving a third support means from a disengaged position spaced away from the pallet into an engaged position supporting the pallet and removing support from the second support means;

transferring the pallet to one of a plurality of delivery locations selected by the operator depending on the type of repairs required by the pallet;

wherein, in use, each of the support means are arranged and controlled so as not to interfere with one another.

Preferably, the first support means supports the pallet from the underneath, the second support means supports the pallet using recesses in the pallet, and the third support means supports the pallet from underneath, and wherein the first support means is moved away from supporting the pallet before the third support means is moved to support the pallet.

Preferably, the support device is moved between its extended and retracted positions along a generally horizontal guide track extending in a first direction, and the transfer carriage moves to and from the plurality of delivery locations along a generally horizontal guide track extending in a direction generally normal to the first direction.

BRIEF DESCRIPTION OF THE DRAWINGS

Preferred forms of the present invention will now be described by way of example with reference to the accompanying drawings, wherein.

DETAILED DESCRIPTION OF THE INVENTION

Figure 1:
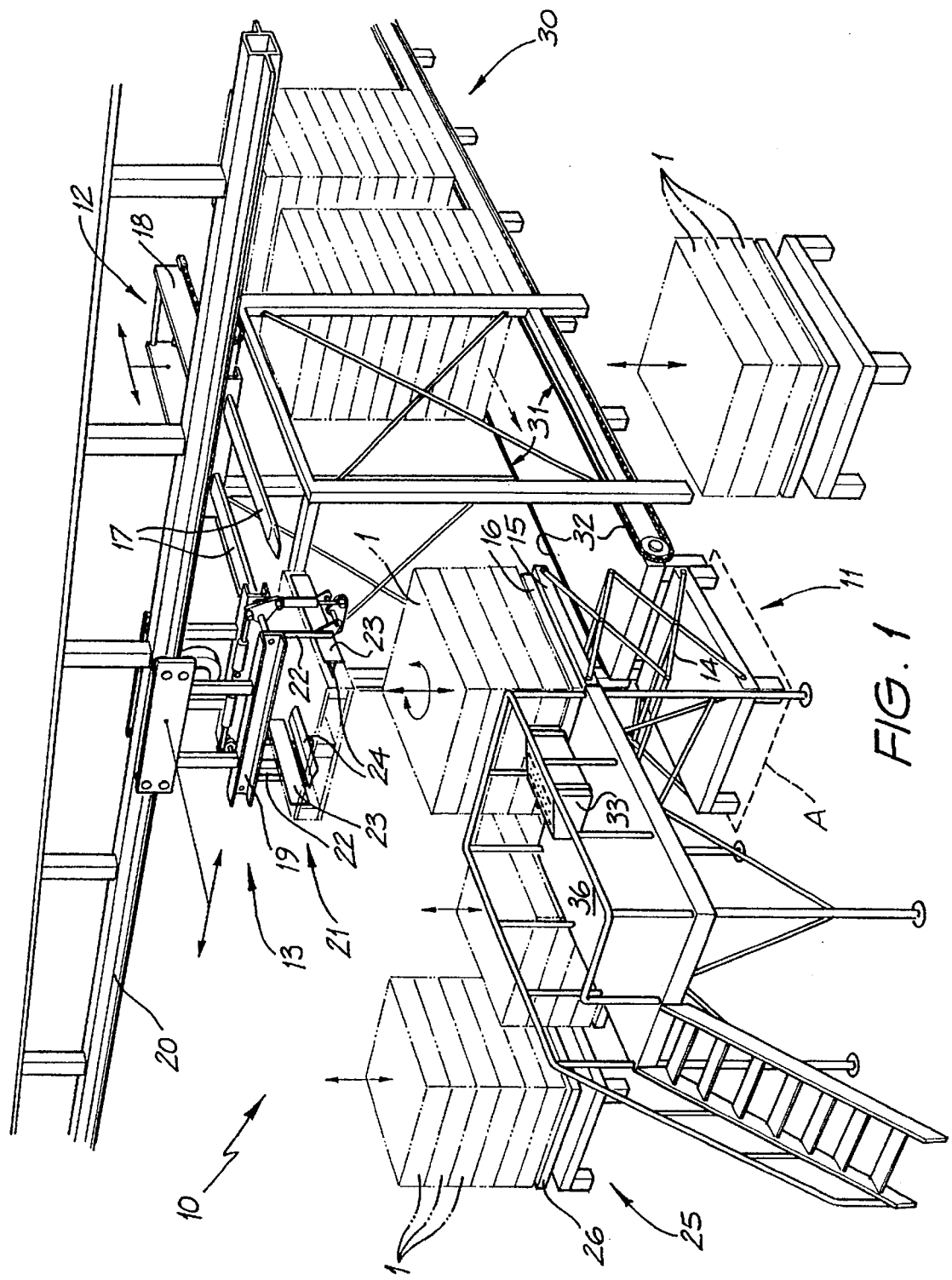
FIG. 1 is a schematic perspective view of the sorting machine of the present invention.
Figure 2:
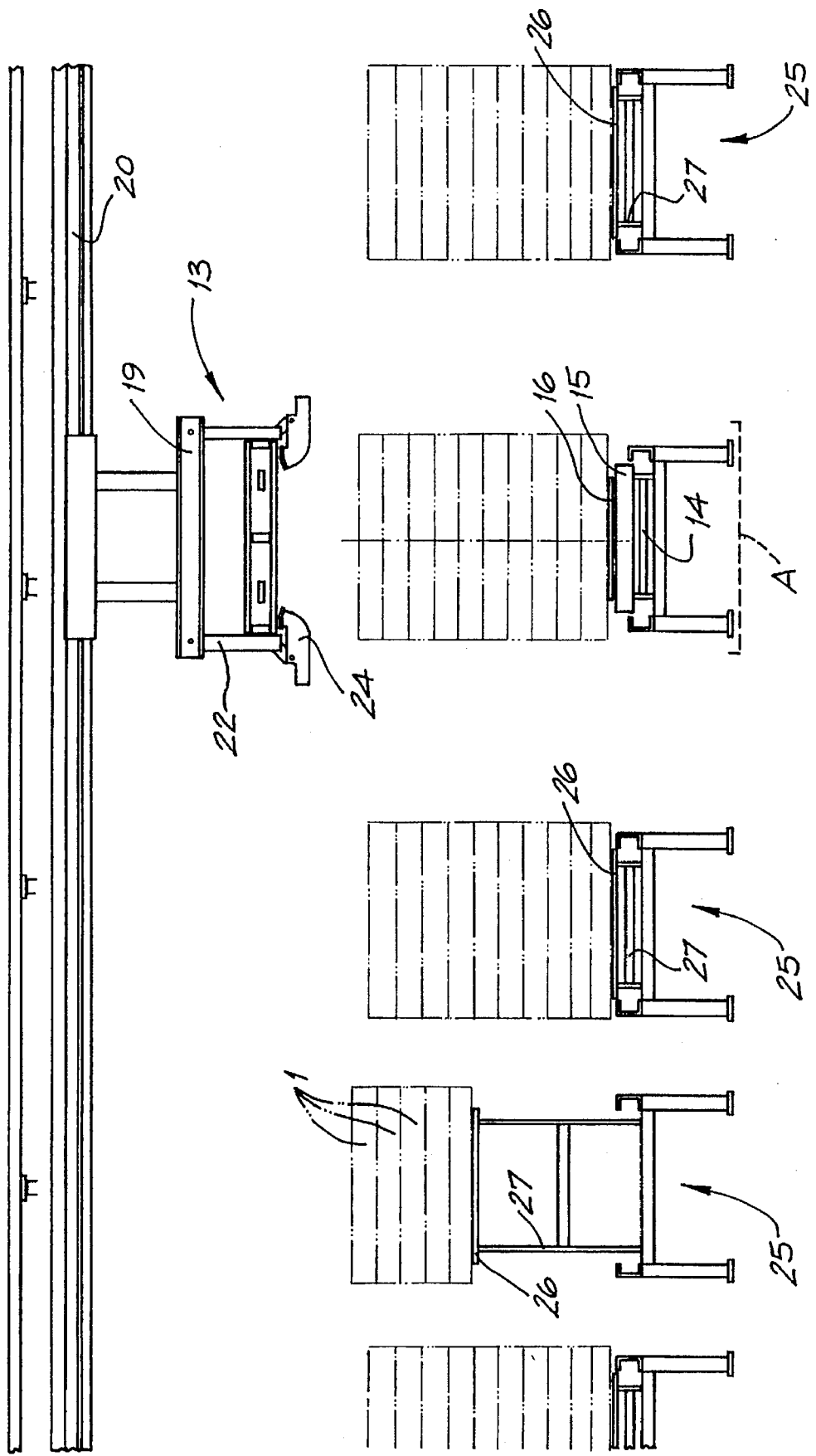
FIG. 2 is a schematic side elevational view from the inspection station of the sorting machine of FIG. 1.
Figure 3:
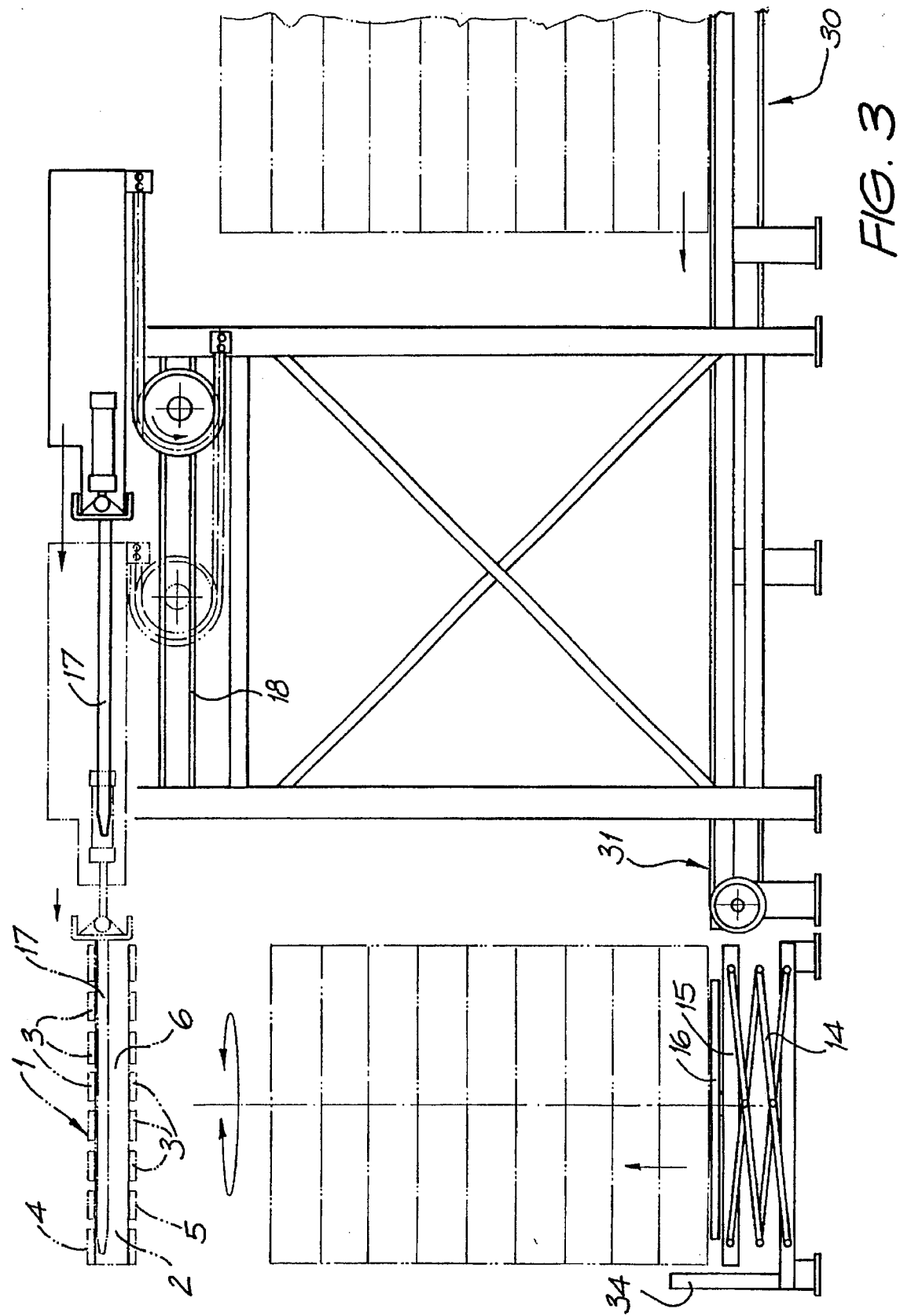
FIG. 3 is a schematic side elevational view of the support device.
Figure 4:
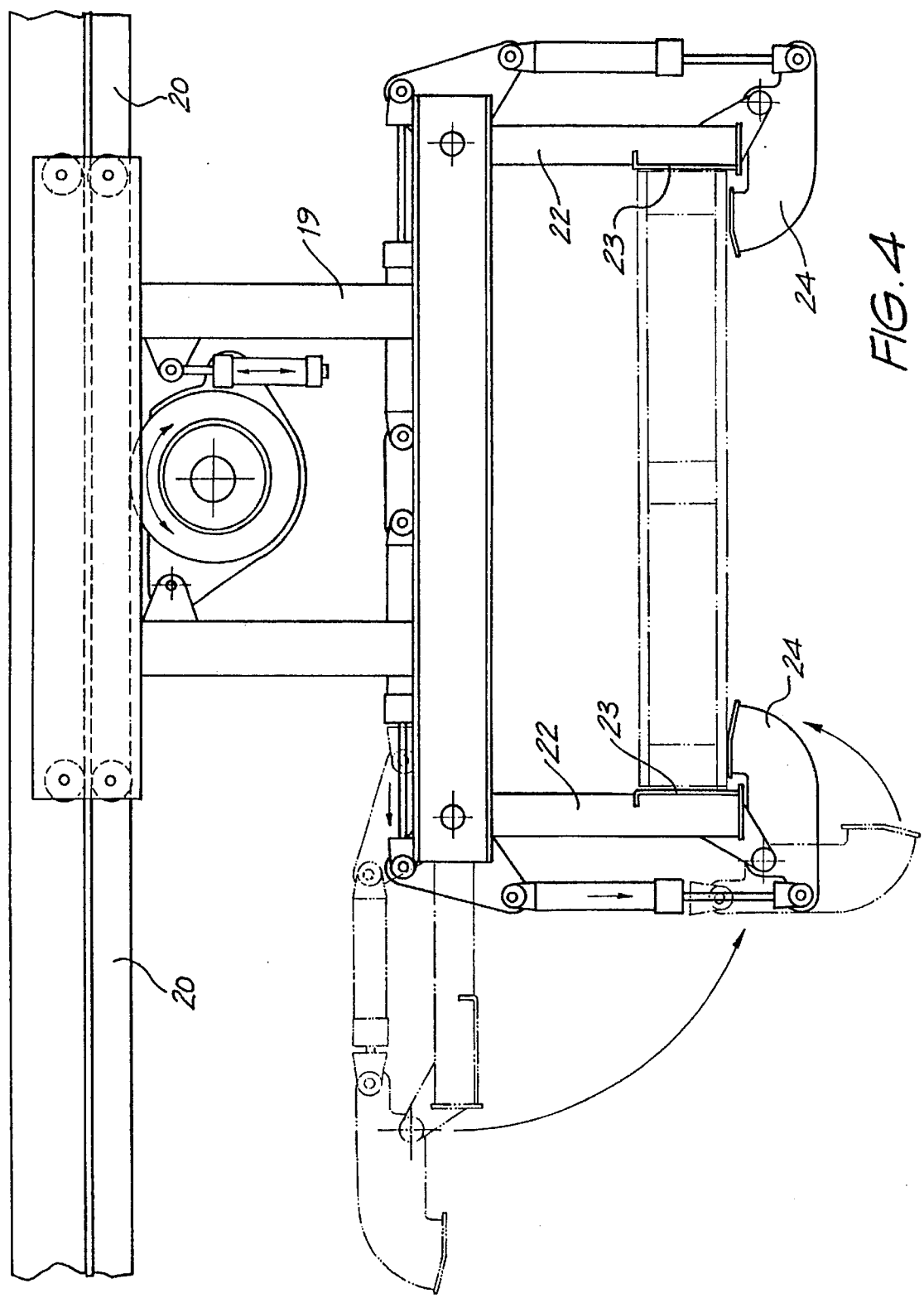
FIG. 4 is a side elevational view of the transfer carriage.
Figure 5:
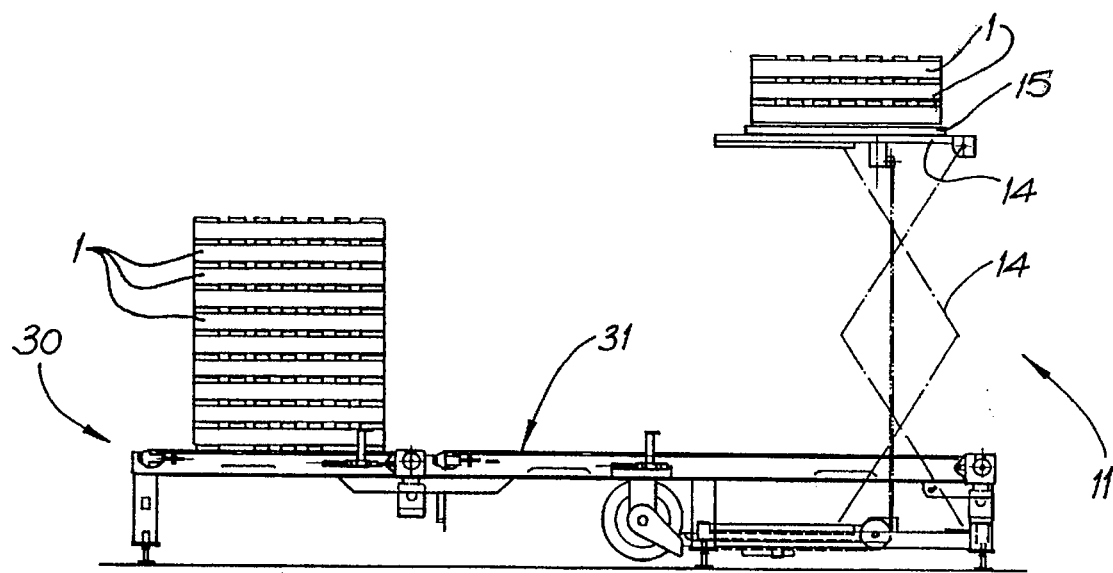
FIG. 5 is a schematic side elevational view of the infeed conveyor and lifting and rotating apparatus.
Figure 6:
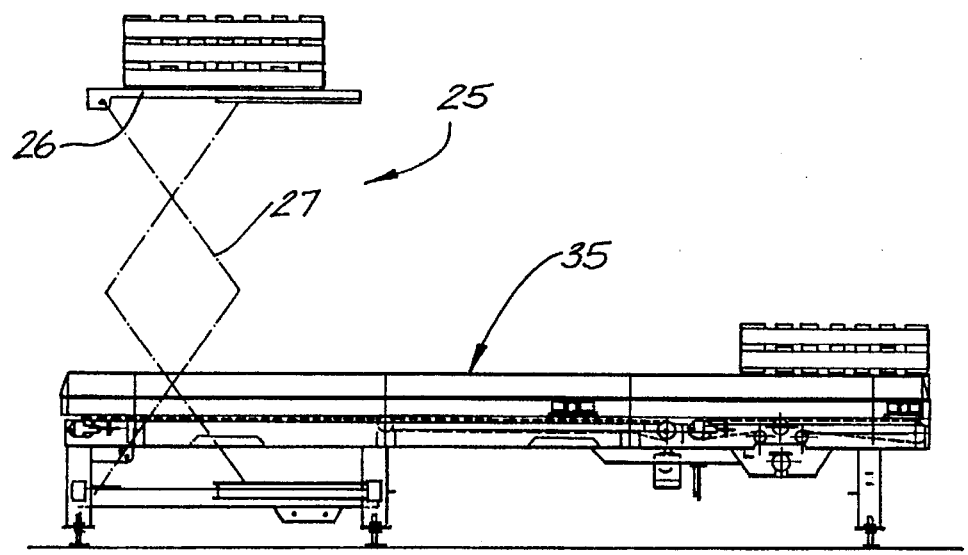
FIG. 6 is a schematic side elevational view of the outfeed station and outfeed conveyor.
Figure 7:
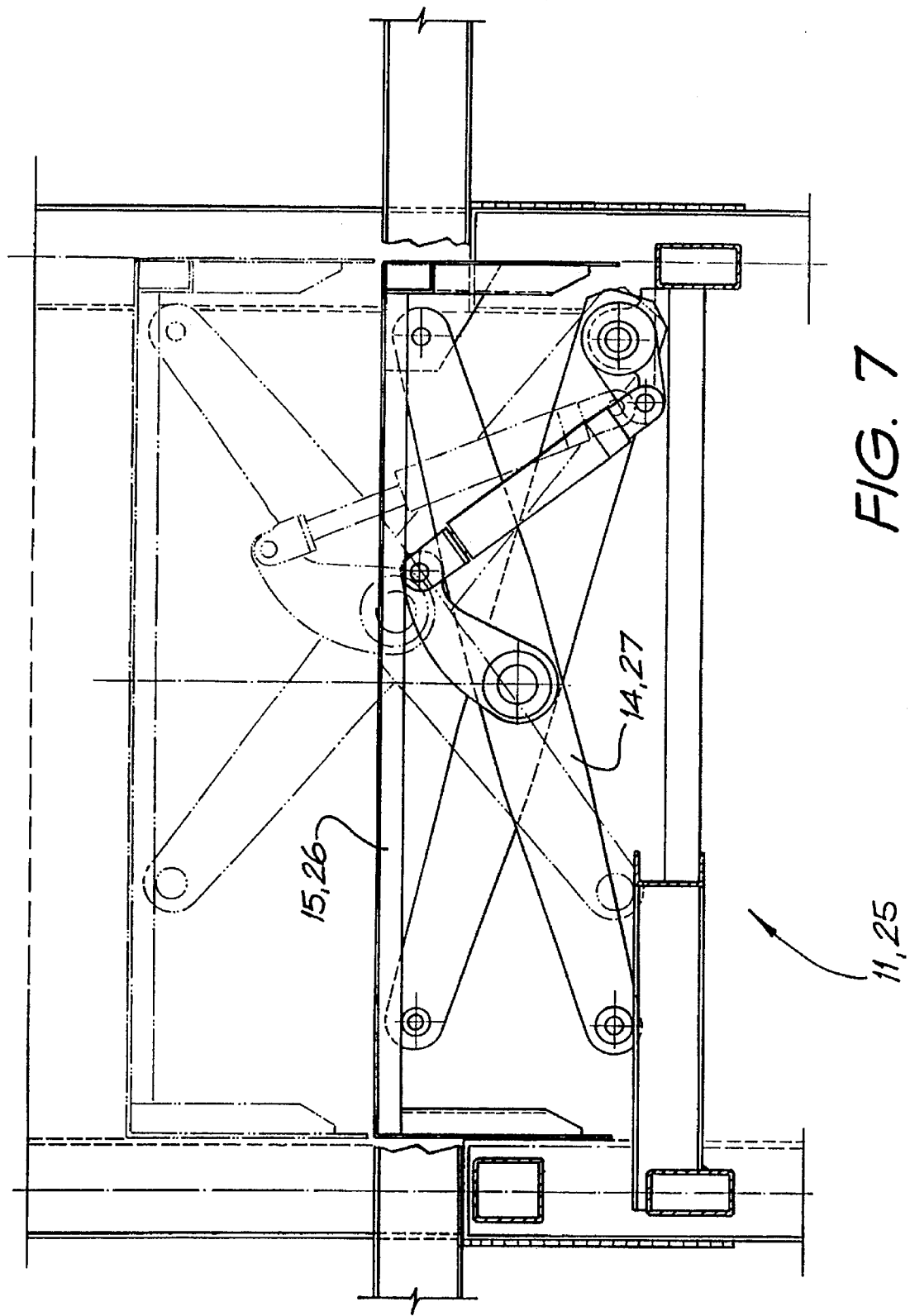
FIG. 7 is a detailed side elevational view of the scissor lift of the lifting and rotating apparatus and the outfeed station.

There is shown a sorting machine 10 for sorting damaged pallets 1 into various predetermined categories depending on the type of repairs required.

The pallets 1 typically comprise at least two and usually three horizontal stringers 2 arranged generally parallel and spaced apart. A number of cross-boards 3 are positioned across, and are attached to opposite sides of the stringers 2 to form both a top 4 and a bottom 5 of the pallet 1. The top 4 of the pallet 1 has a sufficient number of cross-boards 3 to, in combination, provide a support surface for supporting goods to be carried by the pallet 1. In use, the spaces 6 between the stringers 2 and the top 4 and bottom 5 of the pallet 1 can receive the tynes of a forklift or the like to allow the forklift to lift the pallet 1 with goods stacked thereon, when the pallet 1 is initially resting on a support surface. It will be appreciated that the pallets 1 can be stacked together when not in use.

The sorting machine 10 basically comprises a lifting and rotating apparatus 11, a support device 12 and a transfer carriage 13.

The lifting and rotating apparatus 11 generally delimits the inspection zone A and includes an hydraulically operated scissor lift 14 for raising and lowering a support platform 15, and a rotatable platform 16 rotatably mounted on the support platform 15. The rotatable platform 16 receives a stack of pallets 1, and the uppermost pallet 1 can be raised by the scissor lift 14 to an inspection level where it is in clear view of the operator of the machine 10. The rotatable platform 16 is hydraulically controlled so as to be rotatable about a vertical axis with respect to the support platform 15 so that all sides and the top 4 of the uppermost pallet 1 can be viewed by the operator. The stack is then raised by the scissor lift 14 to a transfer level.

The lifting and rotating apparatus 11 also has a level sensor (not shown) to detect when the uppermost pallet 1 of the stack of pallets 1 is at the inspection level, and also to detect when the pallet 1 is at the transfer level in order to control the operation of the scissor lift 14 and the rotation of the rotatable platform 16. The level sensor may be photoelectric cells of known type.

The support device 12 has a pair of tynes 17 slidably mounted on a generally horizontal guidetrack 18 and which is movable by a pneumatic cylinder between a retracted position wherein the tynes 17 are spaced from the inspection zone A and an extended position wherein the tynes 17 are received in the spaces 6 of the uppermost pallet 1 so that the pallet 1 will be supported at the transfer level.

The remaining pallets 1 of the stack on the platforms 15, 16 can then be lowered to a level where the next uppermost pallet 1 on the stack is at the inspection level. Since the first mentioned pallet 1 is still being supported by the tynes 17 so as to be above the stack, this allows the operator to view the bottom of the pallet 1.

The transfer carriage 13 includes a frame 19 which is slidable along a generally horizontal guide track 20 extending generally normal to the guide track 18 of the support device 12, and which extends to both sides of the inspection zone A. A pair of opposed articulated arms 21 are pivotally mounted to the frame 19 so as to be movable by means of hydraulic cylinders between a retracted or disengaged position spaced above the top 4 of a pallet 1 supported by the support device 12 at the transfer level, and an engaged position with first portions 22 of the arms 21 extending generally downwardly from the frame 19 and having generally flat bearing surfaces 23 which are spaced apart and oppose one another and engage or bear against opposite sides of the pallet 1 therebetween. The arms 21 also have a second portion 24 pivotally mounted near a distal end of the first portion 22 which, in the engaged position of the arms 21, extend under and support the bottom 5 of the pallet 1. Accordingly, when the arms 21 are moved into their engaged positions, the pallet 1 is gently squeezed between the arms 21 and securely supported by the transfer carriage 13 and the support device 12 can then be moved into its retracted position. The squeezing and supporting action of the arms 21 serves to minimise the risk of the damaged pallet 1 falling apart in the transfer process.

The transfer carriage 13 together with the pallet 1 supported thereby is then free to be moved along the guide track 20 to a selected one of a plurality of outfeed stations 25.

Each outfeed station 25 has a support platform 26 vertically movable by a hydraulically operated scissor lift 27 so that each station 25 can receive pallets 1 from the transfer carriage 13. Further, each outfeed station 25 is controlled so that it can receive a stack of pallets 1, with each successive pallet 1 being offloaded from the transfer carriage 13 when the support platform 26, or the uppermost pallet 1 of a stack on the support platform 26, is positioned at a pallet receiving level which is a predetermined distance below the transfer level sufficient to allow the arms 21 of the transfer carriage 13 (in their engaged position) to pass over the platform 26/uppermost pallet 1, and to allow the arms 21 to move to their retracted positions so that the pallet 1 can be released and dropped onto the support platform 26/uppermost pallet 1.

The outfeed stations 25 also have a level sensor (not shown) which detects when the support platform 26 or the uppermost pallet 1 is at the pallet receiving level for receiving the next pallet 1 from the transfer carriage 13. The level sensor can be a photoelectric cell of known type.

When a pallet 1 is received from the transfer carriage 13, the scissor lift 27 is caused to lower the stack of pallets 1 so that the uppermost pallet 1 is at the pallet receiving level and is ready to receive the next pallet 1 from the transfer carriage 13.

Once the stack of pallets supported by the support platform 26 contains a preset number of pallets (for example, ten pallets), the stack of pallets is caused to be lowered onto a chain drive conveyor 35 and transported away from the outfeed station 25 to a repair workstation (not shown). The support platform 26 is then raised by the scissor lift 27 up to the pallet receiving level ready to receive the next pallet 1 requiring the type of repair allotted to that outfeed station 25.

The sorting machine 10 is also provided with a pallet stack infeed station 30 where stacks of pallets 1 are delivered to the machine 10, and an electrically controlled chain drive conveyor 31 to transport the stacks of pallets 1 from the infeed station 30 to the inspection zone A. The chain drive conveyor 31 has a pair of parallel spaced apart chains 32 extending in the direction of travel and upon which the bottom 5 of the lowermost pallet 1 of the stack rests. The spacing of the chains 32 is slightly larger than the width of the support platform 14 and rotatable platform 15 of the lifting and rotating apparatus 13, and the chains 32 extend to a position near an end-stop board 34 which delimits the inspection zone A.

Further, the sorting machine 10 has an inspection station 36 where the operator has a clear view of the uppermost pallet 1 on a stack of pallets supported on the lifting and rotating apparatus 11, and where there is provided a control panel 33 having controls (not shown) for the operator to select to which of the outfeed stations 25 the pallet 1 being inspected is to be delivered. The control panel 33 is also provided with other controls (not shown) to stop/restart operation of the sorting machine 10 if it is necessary to interrupt the operation to, for example, remove displaced boards or foreign objects from the uppermost pallet 1.

In use, a stack of pallets 1 is delivered to the infeed station 30 and is moved into the inspection zone A by the chain drive conveyor 31 when the lifting and rotating apparatus 11 has its rotatable platform 15 positioned slightly below the level of the lowermost pallet 1 of the stack of pallets 1.

The lifting and rotating apparatus 13 is then raised so that the stack is then supported by the rotatable platform 16, and continues upwards until the level sensor of the lifting and rotating apparatus 11 detects that the uppermost pallet 1 of the stack is at the inspection level whereupon the lifting movement is automatically stopped by the machine control. The machine control then causes the rotatable platform 16 to rotate 180° so that the operator can view all sides and the top of the uppermost pallet 1.

The lifting and rotating apparatus 11 is then caused to raise the uppermost pallet 1 until the level sensor detects that it is at the transfer level whereupon further upwards movement is stopped and the support device 12 is caused to be moved into its extended position with the tynes 17 being received in the spaces 6 of the uppermost pallet 1.

The lifting and rotating apparatus 11 is then lowered until the next uppermost pallet 1 is at the inspection level thereby allowing the operator to inspect the bottom 5 of the pallet 1 which is now supported by the support device 12.

At this stage, the transfer carriage 13 is positioned over the pallet 1 being supported by the support device 12 and the arms 21 are caused to move to their engaged positions to simultaneously squeeze and support the pallet 1. As soon as the transfer carriage 13 is supporting the pallet 1, the support device 12 is caused to move to its retracted position and the transfer carriage 13 is caused to move to one of the outfeed stations 25 as selected by the operator depending on the type of repairs required to be made to that pallet 1.

When the transfer carriage 13 reaches the selected outfeed station 25, its arms 21 are caused to release the pallet 1 which will then drop the short distance to the support platform 26 or the uppermost pallet 1 of the stack on the support platform 26 of that outfeed station 25.

The transfer carriage 13 then moves back to the inspection zone A to collect the next pallet 1.

In the meantime, the next uppermost pallet 1 will have been inspected by the operator and will be supported by the support device 12, and is then collected by the transfer carriage 13 and moved to the selected outfeed station 25.

It will be appreciated that the sorting machine allows the operator to inspect all sides of the pallets 1 in an efficient and convenient manner and wherein the machine 10 is capable of effectively handling the damaged pallets 1 by means of the unique combination of the lifting and rotating apparatus 11, the tynes 17 of the support device 12, and the squeezing and support action of the cooperating arms 21 of the transfer carriage 13 which minimize the effect of displaced or missing cross-boards on the damaged pallet 1.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A sorting machine for damaged pallets wherein each pallet has one or more recesses extending between opposite ends thereof for receiving tynes of a lifting apparatus such as a forklift and sides extending between the ends so as to be generally rectangular in plan view, the sorting machine comprising:

a lifting and rotating apparatus having a first pallet support means, the apparatus being adapted to support and raise a pallet to a predetermined level and to rotate the pallet about a generally vertical axis;

a support device having a second pallet support means, the device being movable between a retracted out of use position and an extended position supporting the pallet at the predetermined level; and a transfer carriage having a third pallet support means which is movable between a disengaged position spaced away from the pallet and an engaged position supporting the pallet, the transfer carriage being movable to transfer the pallet to one of a plurality of delivery locations selected by an operator depending on the type of damage the pallet has sustained;

a control means to control and coordinate operation of the lifting and rotating apparatus, the support device and the transfer carriage;

wherein, in use, each of the support means are arranged and controlled so as not to interfere with one another.

2. The machine of claim 1 wherein the lifting and rotating apparatus is in the form of a platform having a generally flat surface to support a pallet resting thereon, the platform being rotatable about the generally vertical axis, with a vertical lifting means to raise or lower the platform.

3. The machine of claim 1 wherein the support device is movable between its extended and retracted positions along a generally horizontal guide track.

4. The machine of claim 1 wherein the third pallet support means comprises arms, said arms each having first and second portions, with the first portion being pivotally mounted to a support frame of the carriage and the second portion being pivotally mounted to the first portion, the arms being movable between the disengaged position wherein the first and second portions are spaced above the pallet, to the engaged position wherein each arm extends downwardly from the frame with the first portions bearing inwardly against opposite sides of the pallet and the second portions being positioned under the pallets so that the pallet is securely supported by the transfer carriage.

5. The machine of claim 1 wherein the support device moves between its retracted and extended positions in a first direction relative to the lifting and rotating apparatus, and the transfer carriage operates in a second direction generally normal to the first direction.

6. The machine of claim 1 further comprising an infeed conveyor means for transferring said pallet, or a stack of pallets from a pallet loading position to the lifting and rotating apparatus.

7. The machine of claim 1 wherein the lifting and rotating apparatus includes a pallet level detector which signals the control means when an uppermost pallet of one or more pallets supported on the lifting and rotating apparatus, is at an inspection level whereat the pallet is rotated, or at a transfer level which defines the predetermined level and is a predetermined distance above the inspection level, whereat, in use, the support device supports the pallet as the lifting and rotating apparatus is lowered and the transfer carriage is caused to engage and support the pallet.

8. The machine of claim 7 wherein, in use, the lifting and rotating apparatus supports a stack of pallets, and the level detector detects when an uppermost pallet on the stack is at the inspection level or the transfer level.

9. The machine of claim 1 wherein each delivery location has a support platform which is vertically moveable to a pallet receiving level to receive and support a pallet released from the transfer carriage for delivering the pallet to a predetermined pallet repair workstation.

10. The machine of claim 9 wherein each delivery location also has a pallet level detector which detects when the support platform, a pallet resting on the support platform, or an uppermost pallet of a stack of pallets resting on the support platform, is at the pallet receiving level, and signals the control means for controlling the vertical movement of the support platform of that delivery location.

11. The machine of claim 1 wherein the first support means supports the pallet from underneath, the second support means is in the form of one or more tynes which are receivable in the recesses of the pallet, and the third support means is in the form of opposed articulated arms; and wherein, in use, the support device is initially in its retracted position and, after the pallet has been rotated and raised to the predetermined level by the lifting and rotating apparatus, the support device moves into its extended position with the tynes being received in the recesses of the pallet to thereby support the pallet, the support device remaining in the extended position as the lifting and rotating apparatus is lowered and as the arms of the transfer carriage are moved into their engaged position to support the pallet, whereupon the support device moves into its retracted position and the pallet is then transferred to the selected delivery location.

12. The machine of claim 11 wherein the arms when in their engaged position, are configured and adapted to engage and bear against opposite sides of the pallet to securely capture the pallet therebetween.

13. The machine of claim 11 wherein the lifting and rotating apparatus rotates the pallet 180° about the vertical axis.

14. A method of handling wooden pallets to be inspected and sorted into predetermined categories, the method comprising the steps:

supporting a pallet by a first support means, rotating the pallet about a generally vertical axis and raising the pallet to a predetermined level;

supporting the pallet by a second support means and removing support to the pallet from the first support means;

moving a third support means from a disengaged position into an engaged position supporting the pallet, and removing support to the pallet from the second support means;

transferring the pallet to one of a plurality of delivery locations selected by an operator depending on the type of repairs required to be made to the pallet;

wherein, in use, each of the support means are arranged and controlled so as not to interfere with one another.

15. The method of claim 14 wherein the pallet is rotated about 180° about the vertical axis.

16. The method of claim 14 wherein each delivery location has a support platform which is moved vertically to a pallet receiving level to receive and support a pallet released from the third support means, and the pallet is thereafter delivered to a predetermined pallet repair workstation.

17. The method of claim 16 wherein the support platform, a pallet resting on the support platform, or an uppermost pallet of a stack of pallets resting on the support platform, is detected by a pallet level detector when at the pallet receiving level, and level detector signals the control means to control the vertical movement of the support platform of that delivery location.

18. The method of claim 14 wherein the third support means comprises arms, said arms being in the form of opposed articulated arms which, when in their engaged position, engage and bear against opposite sides of the pallet to securely capture the pallet therebetween.

19. The method of claim 18 wherein the support devices is moved between its extended and retracted positions along a generally horizontal guide track.

20. The method of claim 18 wherein the arms each have first and second portions, with the first portion being pivotally mounted to a support frame of the carriage and a second portion being pivotally mounted to the first portion, wherein the arms are moved between the disengaged position wherein the first and second portions are spaced above the pallet, and the engaged position wherein each arm extends downwardly from the frame with the first portions bearing inwardly against opposite sides of the pallet and the second portions being positioned under the pallets so that the pallet is securely supported by the transfer carriage.

21. The method of claim 14 wherein the first support means supports the pallet from underneath, the second support means supports the pallet using recesses in the pallet, and the third support means supports the pallet from underneath; and wherein the first support means is moved away from supporting the pallet before the third support means is moved into its engaged position to support the pallet.

22. The method of claim 21 wherein the first support means forms part of a lifting and rotating apparatus, the second support means is in the form of tynes which forms part of a support device, and the third support means forms part of a transfer carriage; and wherein, in use, the support device is initially in a retracted position and, after the pallet has been rotated and raised to the predetermined level by the lifting and rotating apparatus, the support device moves into an extended position with the tynes being received in the recesses of the pallet to support the pallet, the support device remaining in the extended position as the lifting and rotating apparatus is lowered and as the third support means of the transfer carriage is moved into its engaged position to support the pallet, whereupon the support device moves into its retracted position and the pallet is then transferred to the selected delivery location.

23. The method of claim 22 wherein the lifting and rotating apparatus includes a pallet level detector which signals the control means when an uppermost pallet of one or more pallets supported on the lifting and rotating apparatus, is at an inspection level whereupon the pallet is rotated, or at a transfer level which defines the predetermined level and is a predetermined distance above the inspection level, whereupon the support device is caused to support the pallet as the lifting and rotating apparatus is lowered and the transfer carriage is caused to engage and support the pallet.

24. The method of claim 23 wherein, a stack of pallets is supported by the lifting and rotating apparatus and the uppermost pallet on the stack is detected by the level detector at the inspection level or the transfer level.

25. The method of claim 22 wherein the support device is moved between its retracted and extended positions in a first direction relative to an inspection zone which is defined by the lifting and rotating apparatus, and the transfer carriage operates in a second direction generally normal to the first direction.

26. The method of claim 22 wherein the support device is moved between its extended and retracted positions along a generally horizontal guide track extending in a first direction, and the transfer carriage moves to and from the plurality of delivery locations along a generally horizontal guide track extending in a direction generally normal to the first direction.

* * * * *